United States Patent Office 3,794,475
Patented Feb. 26, 1974

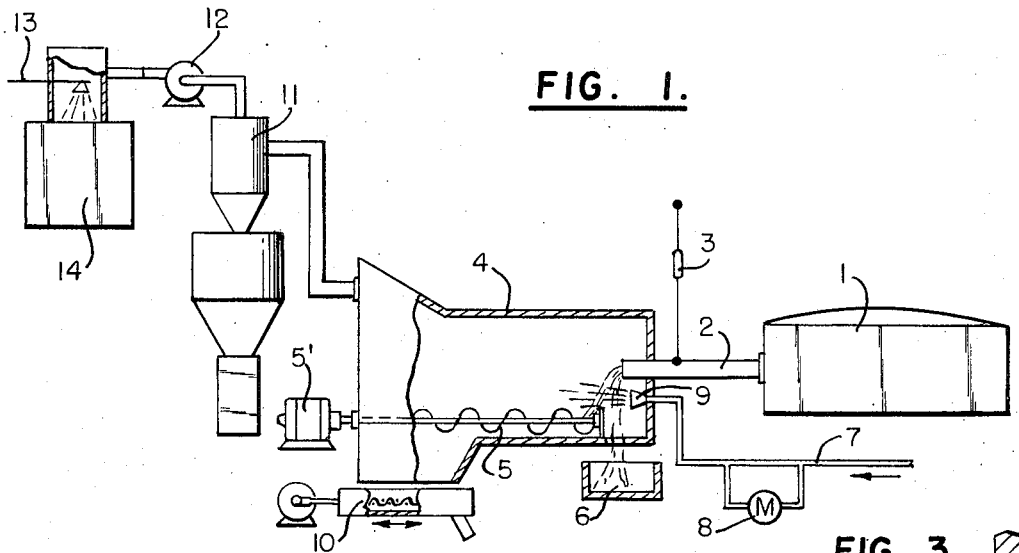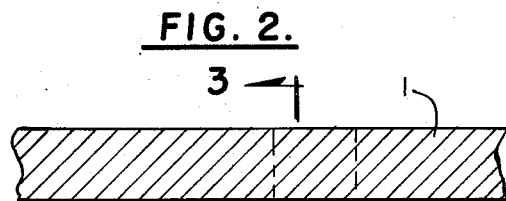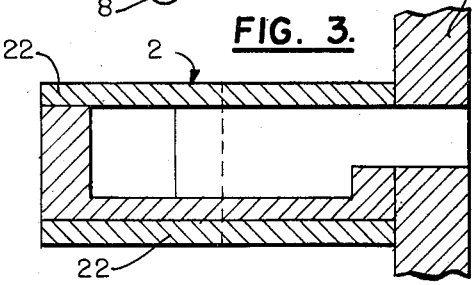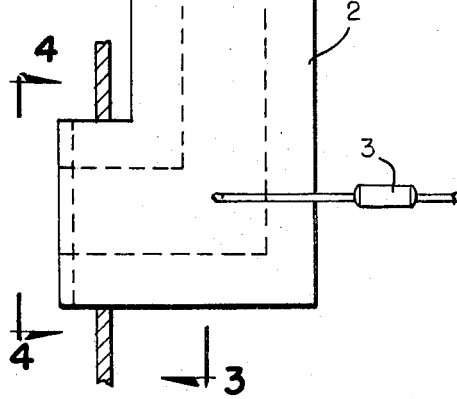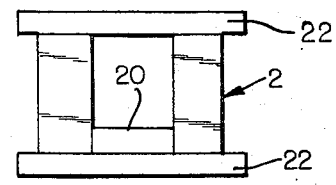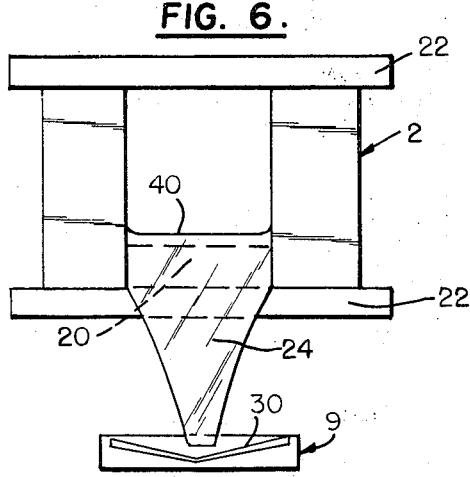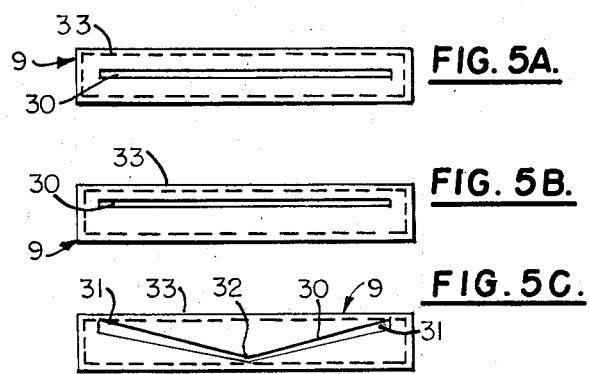

3,794,475
METHOD OF PREPARING SOLUBLE SILICATE FLAKES OR FIBERS
Frank J. Lazet, Media, Pa., and John R. Ahern, Jeffersonville, Ind., assignors to Philadelphia Quartz Company, Philadelphia, Pa.
Continuation-in-part of abandoned application Ser. No. 238,819, Mar. 28, 1972. This application Apr. 18, 1973, Ser. No. 352,857
Int. Cl. C03b *37/06*
U.S. Cl. 65—5                          14 Claims

ABSTRACT OF THE DISCLOSURE

Fine particulate glass, a significant portion of which can be in the form of fine short fibers or flakes, is produced by passing a molten silicate glass at a carefully regulated viscosity in the range of from about 500 to about 10,000 poises across a nozzle having a horizontal slit-like orifice while simultaneously passing a pressurized gas through the orifice and against the molten glass in order to atomize the molten glass to a fine particulate mass.

CROSS-REFERENCE TO RELATED DISCLOSURE DOCUMENTS

This application is related to Disclosure Documents 005233 filed on May 25, 1971 and 005554 filed on June 10, 1971. It is a continuation in part of copending application Ser. No. 238,819 filed Mar. 28, 1972 and now abandoned. The material of said application is incorporated herein by reference.

BACKGROUND OF THE INVENTION

In the manufacture of spray-dried detergents, water solutions or a hydrated form of sodium silicate have always been added to the crutcher ahead of the spray drying tower. The silicate serves as a corrosion inhibitor, a buffer, and contributes to detergency.

If a finely divided anhydrous soluble silicate powder could be added to the crutcher, then the evaporative load on a given spray tower could be reduced. This is especially important in light of using increased amounts of sodium silicate as part replacement for phosphates and the desire to maintain present manufacturing rates with existing spray towers. The essentially anhydrous sodium silicate made by this invention will dissolve rapidly taking up water from the crutcher, acting as a water sink, thus contributing to a higher solids content of the liquid to be spray dried.

The conventional method of preparing a finely divided or ground anhydrous soluble silicate powder has been to take glass from a conventional furnace and cast it into briquets. These must be cooled to below 250° F. before feeding to a conventional ball or rod mill.

Another method of making a finely divided soluble silicate powder is to heat the glass to extremely high temperatures and atomize it with a jet flame similar to what is done in the glass blend industry. The fuel energy is too high and the production rate too low to make this method of manufacture practical for the soluble silicate industry. Exemplary of the art of making glass beads is U.S. Pat. 3,243,373.

SUMMARY OF THE INVENTION

It has been unexpectedly discovered that soluble alkali metal silicate glasses can be subdivided into a fine particulate form at reduced temperatures and correspondingly higher viscosities of the molten glass according to the process of the present invention. By this process there results a new method of producing very thin short fibers or thin small flakes or combinations of both at reduced temperatures, and thus reduced expense. Flakes produced by this process can be thin enough to diffract light, i.e. in the range of from about 0.00002 to 0.00003 inches.

The new method for producing glass in fine particulate form, wherein a significant portion of the particles exist as fine flakes or fibers, according to the present invention comprises the steps of (1) melting a soluble silicate glass comprising, a major portion of, for example, a sodium silicate in a ratio of $SiO_2$ to alkali metal oxide of from about 1.6 to 5.0 in a melting furnace, (2) allowing the molten glass to flow from the furnace in the form of a molten glass sheet or ribbon into an atomizing chamber, (3) passing said molten glass sheet or ribbon by way of free-fall gravitation, in front of a nozzle having a narrow horizontal slit-like orifice, wherein the slit-like orifice is preferably at least as long as or longer than the width of the molten glass sheet or ribbon passing over it, and wherein the molten glass as it passes the nozzle is within a specific viscosity range of 500 to 10,000 poises and preferably 800 to 2000 poises, and (4) simultaneously passing a gas through the nozzle preferably at such a rate that the ratio of gas to molten glass is in the range of from about 0.5 pound of gas per pound of molten glass to about 2.0 pounds of gas per pound of molten glass, wherein the pressure of the gas is in the range of from about 25 to about 125 p.s.i.g.

The anhydrous glass powder that can serve as a crutcher additive for the detergent industry should be in the Tyler sieve range of 100% through 200 mesh (0.0029") and 90% through a 325 mesh (0.0017"). Fibers produced by the process of this invention can easily be chopped into the desired length.

As the temperature of the molten glass is reduced even lower than that required for fibers one can produce glass flakes $\frac{1}{50}$ the thickness of ordinary cellophane, i.e. in the range of 0.00002 to 0.00003 inches. These flakes are smaller than can be ground in a conventional ball mill and are not contaminated with inert material as found in a ground product.

From the above general discussion one can see that the critical control with respect to the physical form of the product is viscosity. More viscous material produces flakes, lower viscosity produces fibers. The temperature of the molten glass determines the viscosity of the glass as it comes under the influence of the nozzle.

While glasses having an $SiO_2$-alkali metal oxide mole ratio of between 1.6 and 5.0 are suitable for use in this process one must ensure that the viscosity is proper for the desired end product. Consequently the temperature range will vary for each different glass ratio in order to maintain viscosity in the required range.

For a soluble glass ratio of about 2.3 to 2.45, this process will produce predominately fibers as discussed above when the glass is in the temperature range of 1980° F. and hotter. In the temperature range of 1940° F. to 1980° F., product consisting of a mixture of the thin fibers and thin flakes is made. As the glass is further cooled and in the range of 1900 to 1940° F., the thin flakes are produced to the point where one can obtain 100% conversion to flakes at the lower temperature. For a glass ratio of about 5.0 the temperature range would be about 2100° F. to 2440° F.

For a glass ratio of about 2.0 the temperature of the molten glass as it passes in front of the orifice of the nozzle could be in the range of about 1600 to 1950° F.

The fibers or flakes made by this invention cool themselves very quickly eliminating the need for the long and expensive glass cooling conveyors normally used for preparing the glass fed to a conventional ball mill for grinding.

In the preparation of particulate soluble silicate glasses, we have developed the process of the present invention, wherein, contrary to what would be expected in the production of particulate glass materials, the molten glass leaving the melting furnace is cooled down prior to being atomized with a gas stream. The molten glass withdrawn from the melting furnace travels or flows within a forehearth used to reduce and control the glass temperature as well as spread the glass over the discharge edge of the forehearth in the form of a molten glass sheet or ribbon. The molten glass then begins a free fall gravitational flow.

In its free-fall the molten glass passes in front of a gas nozzle situated below and behind the terminal lip of the forehearth. The nozzle is provided with a horizontal slit-like orifice through which the atomizing gas is passed. The slit-like orifice of the nozzle is of a horizontal length so as to be at least as long and preferably longer than the width of the molten glass sheet or ribbon which passes in front of it. Preferably, the slit-like orifice opening of the nozzle is in the form of a straight-line opening which will provide a constant pressure profile across the intersection with the glass ribbon.

As the molten glass falls in front of the nozzle the atomizing gas is blown through the orifice against the glass subdividing the glass into very fine fibers and/or flakes.

Fibers produced by this process can be on the order of 0.0005 to 0.01 inches in diameter and are preferably in the range of 0.001 to 0.005 inches. The fibers can have an untamped density of 3 to 9 lbs. per cu. ft. and a maximum length of 1" and preferably 0.2 to 0.5 inches.

Flakes produced by this process will generally have an average diameter of 0.1 to 0.4 inches however the diameter can be on the order of 0.01 to 0.8 inches. Thickness can vary from 0.0005 down to 0.000005 inches. The flakes can have an untamped density of 4 to 10 lbs. per cu. ft. When atomization takes place with a jet of steam the flakes and fibers become partially hydrated and can contain up to 5% water therein.

Both the gas atomizing nozzle and the terminal lip of the forehearth are situated at the inlet end of a suitable chamber which provides a relatively large area in which the atomizing of the glass ribbon can take place and the fine glass particles produced can be collected. The fibers and larger particles produced are generally collected at the bottom of the atomizing chamber while the finer particulate flakes of glass are collected as a dust or powder by conventional means i.e. cyclone dust collectors.

The process of the present invention is effective with soluble glasses comprising a major portion of sodium or potassium silicate in a ratio of $SiO_2$ to alkali metal oxide of from about 1.6 to about 5.0 and preferably 1.6 to 4.0. The preferred sodium silicate utilized is one wherein the ratio of $SiO_2$ to $Na_2O$ is in the range of from about 2.0 to about 4.0 and most preferably 2.2 to 2.5. Preferred $SiO_2$ to $K_2O$ ratio is 1.8 to 2.8. It is preferable to the successful operation of the process of the present invention that the viscosity of the molten glass ribbon as it passes in front of the atomizing nozzle be in the range of from at least about 800 poises to about 2000 poises and most preferably about 900 poises to about 1100 poises. It is at this viscosity that the glass ribbon can be converted into fine particulate fibers and flakes of glass according to the present invention.

The gas used as the atomizing fluid can be any suitable gaseous or vapor material. For example, the gas jet emanating from the nozzle can be air, any hot gas such as products of combustion or steam. Steam has been found to be most suitable and economical in the present process. When steam is used it has the advantage, when used in conjunction with the soluble glasses, of partially hydrating the product with up to about 4 to 5% of water depending upon the temperature and composition of the steam jets as well as the composition of the glass melt.

The hydration of these glass flakes is a factor in the rate at which they dissolve and it is an advantage to have a small amount of water in them.

Whatever the gas used to atomize the molten glass ribbon, the gas should be at a pressure in the range of from about 25 to about 125 p.s.i.g. Preferably the gas pressure is from 60 to about 80 p.s.i.g. The atomizing gas is supplied to the nozzle at a rate such that about 0.5 to 2.0 pounds of gas are used for each pound of molten glass atomized, preferably the gas is supplied to the nozzle so as to use about 0.6 to 1.0 pounds of gas per pound of molten glass atomized. The thinner the glass sheet intersecting with the jet, the lower will be the gas pressure required to form either fibers or flakes. This can be controlled by the construction of the forehearth lip as well as the glass flow.

The construction of the nozzle involves certain characteristics which effect favorable operation of the process of the present invention. The length of the horizontal slit-like orifice in the nozzle should be such as to be at least slightly longer than the width of the glass ribbon flowing vertically in front of the nozzle. The width of the nozzle opening should preferably be uniform for its full length. The slit-like orifice of the nozzle for use according to the present invention can have opening of from about $\frac{1}{32}$ inch to about $\frac{1}{8}$ inch. The orifice chamber should be designed to provide a flat pressure profile across its entire width. The bulk density of the flakes is readily increased by deaerating and/or grinding as with a Sweco mill. For instance, with only one pass of the Sweco vibro energy mill, the initial bulk density of fine flakes of 6 lbs. per cu. ft. was increased to 37 lbs. per cu. ft. The fibers were increased from an initial density of 5 lbs. per cu. ft. to 60-70 lbs. per cu. ft. with one pass of the mill, and to 80 lbs. per cu. ft. with two passes.

DESCRIPTION OF THE DRAWINGS

FIG. 1 represents a schematic diagram of a complete process for atomizing molten glass to a fine particulate mass according to the process of the present invention.

FIG. 2 is a plan view of an embodiment of the glass forehearth leading from the glass furnace into the atomizing chamber.

FIG. 3 is a sectional view taken along line 3—3 of FIG. 2.

FIG. 4 is an end view of the terminal portion of the draw chamber, viewed along line 4—4 of FIG. 2.

FIGS. 5A, B, and C illustrates the end views of three suitable types of gas nozzles which can be used in the process of the present invention.

FIG. 6 is an end view showing how the molten glass ribbon flows over the terminal lip of the forehearth and falls vertically in front of the gas nozzle situated below and behind the edge of the terminal lip portion of the forehearth.

Referring now to FIG. 1, molten glass is drawn from the melting furnace 1 into a forehearth 2 which carries the molten glass into the atomizing chamber 4. A thermocouple 3 can be placed in the path of the molten glass as it flows along the draw chamber. The molten glass falls in the form of a ribbon from the end of the forehearth, said ribbon dropping in front of an atomizing nozzle 9 to which an atomizing gas 7 is supplied, the gas being metered by gas meter 8. If the source of the gas used for atomizing should fail, the ribbon of glass can be collected in the molten glass sump 6. The fine particulate glass flakes formed in the atomizing chamber 4 fall to the bottom of the atomizing chamber and are conveyed by ribbon conveyor 5 which is driven by a motor 5' to a vibrating conveyor 10 or any other type of conveyor desired.

That volume of the extremely fine glass particles or flakes which do not settle to the bottom of the atomizing chamber 4 are carried to a dust collector 11, illustrated here as a cyclone dust collector and hopper. The gas from the dust collector 11 is carried through the blower fan 12 and water sprays 13 into collecting tank 14.

FIGS. 2, 3, and 4 illustrate various views of an embodiment of the forehearth which carries the molten glass from the furnace to the atomizing chamber. The glass leaves the furnace 1 and enters the forehearth 2. A thermocouple 3 can be placed within the channel of the forehearth. The molten glass flows through the forehearth for further cooling and conditioning and over the terminal lip 20 of the forehearth, which terminal lip is situated inside the edge 21 of the atomizing chamber. The terminal lip 20 generally protrudes beyond the tile 22 situated below it. A protrusion of about one inch is generally sufficient. Tile members 22 are generally placed on both the upper and lower surfaces of the draw chamber 2.

FIGS. 5A, B, and C illustrate three embodiments of the configuration of the atomizing nozzle 9 which can be used in the present invention. The nozzle is generally formed from steel plate 33. However, any suitable material will suffice. In FIG. 5A it can be seen that the nozzle 9 represents a horizontal opening of uniform orifice 30. FIG. 5B illustrates a different position of the orifice 30. FIG. 5C illustrates a shallow V-shaped nozzle wherein the extreme outer portions of the V-shaped orifice 30 opening are larger than the central portion of the orifice opening. The wider outer edges 31 uniformly taper down to a narrower central portion 32 in the V-shaped horizontal orifice.

FIG. 6 illustrates the method by which the molten glass ribbon flows vertically in front of the atomizing nozzle 9. Numeral 40 indicates the depth of the molten glass as it flows through the forehearth 2. The glass as it reaches the terminal lip 20 of the forehearth begins its vertical free-fall gravitational flow. As the glass begins to fall vertically it falls in the form of a ribbon 24, which ribbon flows across the center of the orifice 30 of nozzle 9. This figure illustrates the feature that the horizontal length of the nozzle orifice 30 is substantially greater than the width of the molten glass ribbon 24, as the ribbon passes the orifice.

EXAMPLES

The following examples are included as illustrative of the process of the present invention and are in no way intended to be limitations on the scope of the present invention.

Example 1

Using the glass processing equipment of FIG. 1, the forehearth chamber of FIGS. 2–4 and the atomizing nozzle of FIG. 5A, a sodium silicate glass having a $SiO_2$ to $Na_2O$ ratio of 2.35 was subdivided according to the process of the present invention. The glass temperature at the terminal lip of the forehearth was 1970° F. corresponding to a viscosity of 900 poises and the atomizing gas was steam at 80 p.s.i.g. The glass flow rate was 4500 pounds per hour and the length of run lasted 25 minutes. The steam consumption rate during this 25 minute run was at a rate of 4600 pounds per hour.

All of the glass was 100% completely atomized with no gobs of molten glass nor clogging of the machinery by molten glass sticking to the interior of the atomizing chamber. The portion of the finished product discharged at the vibrating conveyor was discharged at a temperature of from 80 to 100° F. The product consisted mostly of fibers whose maximum length were ½" and having a diameter between .001" and .005 inches. The fibers were very friable.

The bulk density of the product was 5 pounds per cubic foot. These could be readily densified using, for instance, a Sweco mill to produce a product of 35 to 50 lbs. per cubic foot.

Example 2

It is also possible with slight variations in the process such as decreasing the thickness of the glass sheet intersected by the jet, lowering the jet pressure, and decreasing the glass temperature, i.e. increasing its viscosity, to produce fine flakes.

In one test using a sodium silicate glass having a $SiO_2$ to $Na_2O$ ratio of 2.35, a glass temperature at the terminal lip of the forehearth of 1900° F. corresponding to a viscosity of about 1500 poises, atomizing steam at 40 p.s.i.g., and a glass flow rate of 2400 pounds per hour, we converted nearly all of the molten glass into flakes whose diameter were about ¼ inch and the thickness being in the range of 0.00002 to 0.00003 inches. Steam flow rate was 0.7 lbs. steam per pound of glass Practically all of the product was so light weight that it could only be collected in the cyclone dust collector, very little having settled out in the atomizing chamber. Bulk density of the flakes as made was 5 pounds per cubic foot, and only 15 pounds per cubic foot after grinding in a Sweco mill. An analysis of the flake product gave the following:

| | Wt. percent |
|---|---|
| $Na_2O$ | 29 |
| $SiO_2$ | 69 |
| $H_2O$ | 2 |
| | 100 |

Example 3

The procedures of Example 1 where followed using a molten glass having an $SiO_2/Na_2O$ mole ratio of 3.22/1.0. The temperature was adjusted to obtain viscosity of 900 poises. Flakes were obtained having a density of 6 lbs. per cu. ft.

What we claim is:

1. A process for producing glass in fine particulate form consisting of fibers and/or flakes comprising the steps of:
   (a) melting an alkali metal silicate glass in a furnce,
   (b) allowing said molten glass to flow from said furnace in the form of a molten glass sheet or ribbon into an atomizing chamber,
   (c) passing said molten glass ribbon across a nozzle having a narrow horizontal slit-like orifice, said nozzle situated in said atomizing chamber, wherein said nozzle is situated at a spaced distance from said molten glass ribbon which passes across said nozzle, wherein said molten glass, a it passes across said nozzle, is at a viscosity of from about 500 poises to about 10,000 poises,
   (d) simultaneously passing a gas through said nozzle at a gas pressure of from about 25 to about 125 p.s.i.g.

2. The process of claim 1 wherein the molten glass has a viscosity of 800 to 2000 poises as it passes across said nozzle.

3. The process of claim 1 wherein said glass is a soluble glass.

4. The process of claim 1 wherein said molten silicate glass comprises a major portion of soluble sodium silicate in a ratio of $SiO_2$ to $Na_2O$ in the range of from about 1.6 to about 5.0.

5. The process of claim 4 wherein said molten sodium silicate is maintained at a temperature between 1600° F. and 2440° F. as it passes across said nozzle.

6. The process of claim 3 wherein said soluble glass is a sodium silicate glass having a $SiO_2$ to $Na_2O$ mole ratio of from about 2.0 to about 4.0.

7. The process of claim 5 wherein said molten glass is a sodium silicate with an $SiO_2/Na_2O$ mole ratio in the range of from about 2.3 to 2.45 and wherein said molten glass is at a temperature of from about 1900° F. to about 1980° F. as it passes said nozzle.

8. The process of claim 1 wherein said gas is passed through said nozzle at such a rate that the ratio of said gas to said molten glass is in the range of from about 0.5 to 2.0 pounds of said gas per pound of said molten glass.

9. The process of claim 6 wherein said ratio of said gas to said molten glass is about 0.6 to 1.0 pounds of said gas per pound of said molten glass.

10. The process of claim 1 wherein said pressure of said gas is in the range of from about 60 to about 80 p.s.i.g.

11. The process of claim 1 wherein said slit-like orifice is longer than the width of said molten glass ribbon passing across it.

12. The process of claim 1 wherein said slit-like orifice is in the form of a straight line opening.

13. The process of claim 1 wherein said glass is a soluble silicate glass and wherein said gas is steam.

14. Finely divided alkali metal silicate particles having an $SiO_2/M_2O$ mole ratio of 1.6 to 5.0/1.0 and a bulk density of 3 to 10 lbs./cu. ft. prepared by the process of claim 1.

References Cited

UNITED STATES PATENTS

| | | | |
|---|---|---|---|
| 1,977,406 | 10/1934 | Powell | 65—11 R X |
| 2,578,986 | 12/1951 | Schoonenberg et al. | 65—11 R X |
| 3,048,217 | 8/1962 | Denniston | 65—16 X |
| 3,325,263 | 6/1967 | Day et al. | 65—21 |
| 3,682,666 | 8/1972 | Lacourrege | 65—21 X |

FOREIGN PATENTS

| | | | |
|---|---|---|---|
| 1,053,383 | 3/1959 | Germany | 65—5 |

ROBERT L. LINDSAY, JR., Primary Examiner

U.S. Cl. X.R.

65—13, 21